United States Patent

[11] 3,584,709

| [72] | Inventor | William A. Conway<br>Cincinnati, Ohio |
|---|---|---|
| [21] | Appl. No. | 835,332 |
| [22] | Filed | June 23, 1969 |
| [45] | Patented | June 15, 1971 |
| [73] | Assignee | The Conway Clutch Company<br>Cincinnati, Ohio |

[54] PNEUMATIC-HYDRAULIC DISC BRAKE
3 Claims, 4 Drawing Figs.
[52] U.S. Cl. ................................................ 188/152,
188/72.5, 188/73.5
[51] Int. Cl. ................................................ B60t 13/26
[50] Field of Search ........................................ 188/73.1,
73.5, 72.5, 152.4, 152.48, 152.41, 205.3; 303/2

[56] References Cited
UNITED STATES PATENTS
| 2,248,435 | 7/1941 | Pleines | 177/152(.4) X |
| 3,260,331 | 7/1966 | Borman, Jr. | 188/170 X |
| 3,476,217 | 11/1969 | Knapp | 188/205(.3) |

FOREIGN PATENTS
| 1,182,479 | 11/1964 | Germany | 188/205.3 |

*Primary Examiner*—George E. A. Halvosa
*Attorney*—Wood, Herron & Evans

ABSTRACT: A combination pneumatic-hydraulic brake for stopping or retarding rotation of a brake disc secured to a movable element of a machine. The brake assembly consists of a pneumatic booster cylinder operable upon application of low air pressure to supply high-pressure hydraulic fluid to a pair of opposed hydraulic motors. Actuation of the hydraulic motors moves a pair of opposed brakeshoes into engagement with the brake disc.

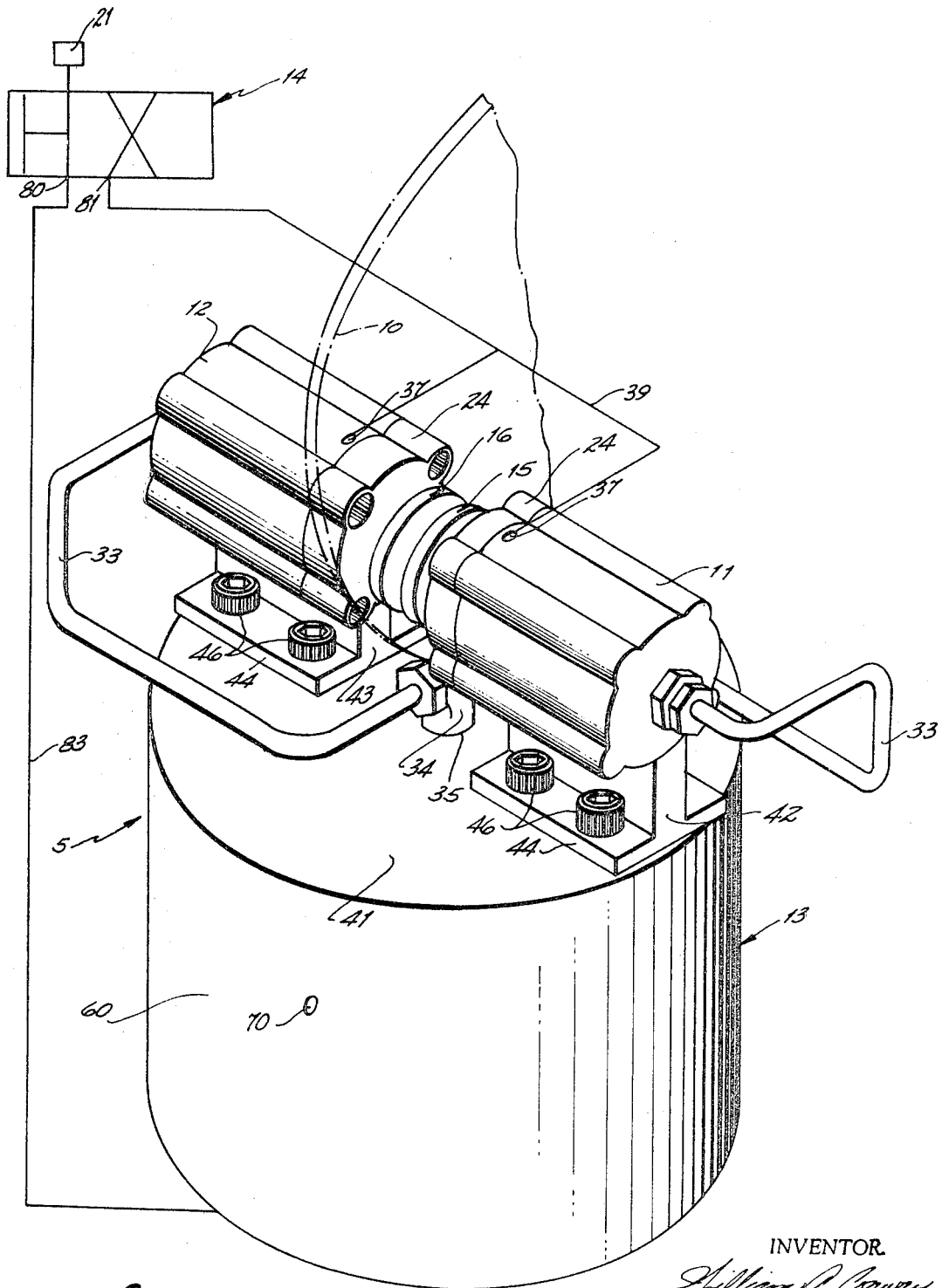

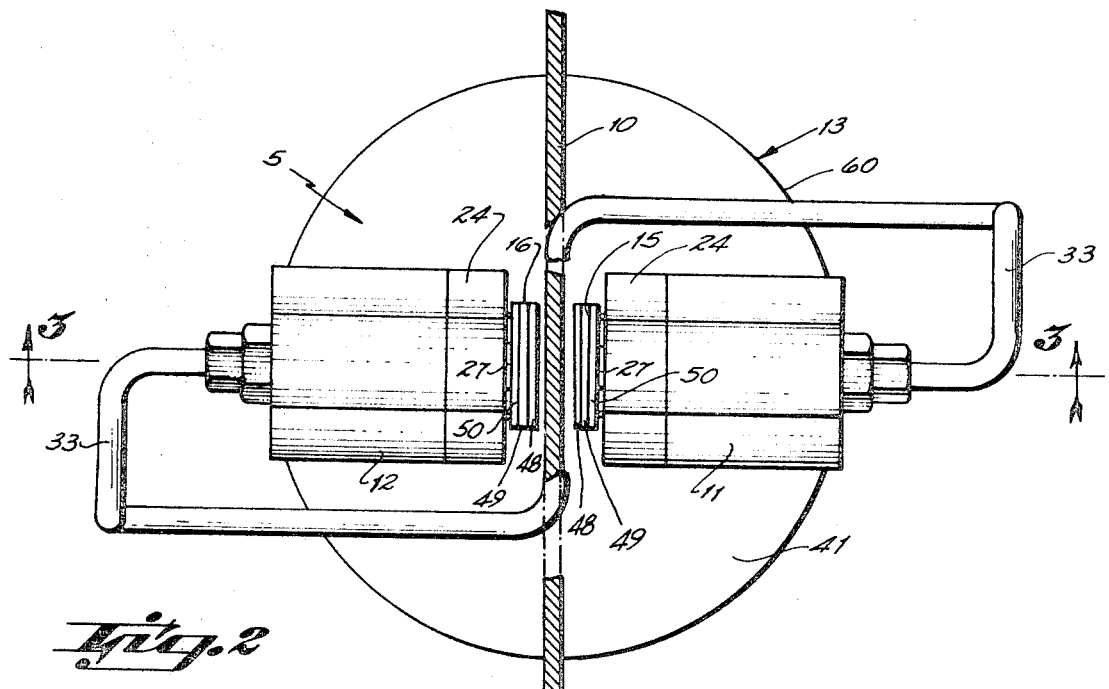

PNEUMATIC-HYDRAULIC DISC BRAKE

The invention of this application is to be used as a component of machinery located in factories or shops which have readily available pneumatic air pressure. Nearly every factory or shop has such pressure available for driving pnuematic motors or cleaning machinery, etc.

At the present time disc brakes are commonly used to stop or retard the movement of all types of machinery and movable vehicles. These brakes operate upon the principle of moving opposed brakeshoes into engagement with opposite radial side surfaces of a disc secured to an element to be braked or stopped.

Disc brakes have numerous advantages over other types of conventional brakes. The primary advantage is the heat dissipation characteristic which enables the brake to dissipate heat to the atmosphere quickly and thereby maximize braking force.

While the advantages and operating characteristics of disc brakes are well known and are desirable in many industrial applications, they are often not used in such applications because of the extensive and expensive equipment required to actuate the brakeshoes. Specifically, several thousand pounds of pressure is generally required to move the brakeshoes into engagement with the brake disc in order to generate the necessary foot-pounds of force at the disc to stop is rotation. This magnitude of pressure is usually supplied by a hydraulic unit to which fluid under pressure is supplied by a fluid pump. The cost of this equipment; i.e., pumps, motors, etc., is usually too great to justify the use of conventional disc brakes on many industrial applications where the brakes would otherwise be very desirable.

Consequently, it has been a primary objective of this invention to provide an inexpensive hydraulic disc brake assembly which utilizes a readily available and inexpensive source of power to actuate the brake.

Another objective of this invention has been to provide an inexpensive disc brake assembly which is easily maintained and is not subject to wear or breakdown.

The invention of this application accomplishes these objectives by completely eliminating the necessity for a hydraulic pump to generate either the flow or the pressures to actuate the hydraulic pistons of the brake. Specifically, one aspect of the invention of this application is predicated upon the use of a pneumatic booster motor or cylinder to generate the high hydraulic pressures required to actuate the brake. Since air pressure at approximately 100 pounds pressure is available in very nearly every shop or factory at practically no additional cost, its use in lieu of a pump is very advantageous.

Another objective of this invention has been to provide a disc brake assembly which has a minimal number of moving parts subject to wear. A disc brake used on industrial machinery must be very nearly foolproof and subject to practically no breakdown or "downtime" because the brake is often only one small part of a very large machine or even of a whole plant, all of which is dependent upon the operation of the brake for continued operation. If any maintenance of the brake is required in this type of machinery it often means shutdown of a large and expensive piece of machinery or even of a whole plant. Therefore, the brake of this invention utilizes a minimal number of moving parts and is so designed that the pads or friction elements of the brakeshoes may be replaced without disassembling the brake.

The brake assembly which accomplishes these objectives comprises a pneumatically actuated booster cylinder operable upon application of approximately 100 pounds of air pressure to generate approximately 2,000 pounds of hydraulic pressure. This high hydraulic pressure is then channeled through a pair of conduits to two hydraulic motors located on opposite sides of a brake disc. Actuation of these hydraulic motors moves a pair of brakeshoes into engagement with the disc.

Air pressure is used to release or move the brakeshoes out of engagement with the brake disc. This air pressure is supplied to the release side of the brakeshoe pistons to effect movement of the brakeshoes away from the brake disc. A four-way valve controls application of the air pressure to either the pneumatic booster cylinder or the release ports of the hydraulic brake cylinder.

Each brakeshoe consists of a braking pad adhesively secured to a backing plate. The backing plate is removably secured to a movable element of one of the hydraulic motors by a permanent magnet. Cooperating keys on the plate and the movable element of the hydraulic motor prevent rotation and lateral shifting of the backing plate relative to the supporting element of the brakeshoe.

Numerous advantages accrue from this construction. Among these advantages is the minimization of parts subject to wear, fatigue or failure and the elimination of all springs or other resilient brake release elements.

Another advantage of this construction is the ease with which it enables friction pads to be replaced on the brakeshoes. The friction pads are subject to wear and therefore must be regularly replaced. Use of magnets to hold the pad on the brakeshoe assembly eliminates the necessity to dissemble the brake in order to replace the wear pads.

The greatest advantage of this assembly though is its utilization of hydraulic motors in combination with a pnuematic booster in such a manner as to completely eliminate the necessity for an expensive hydraulic pump in the system. This feature reduces the cost of the complete braking system and thereby enables it to be used in many applications where disc brakes were heretofore impractical.

Another advantage of the brake is its simplicity which enables it to be inexpensively manufactured and maintained. Its simplicity and utilization of a closed hydraulic system also enables it to be used in all types of operating environments with minimal maintenance.

These and other objects and advantages of this invention will be more readily apparent from the following description of the drawings in which:

FIG. 1 is a perspective view of a disc brake assembly incorporating the invention of this application.

FIG. 2 is a side elevational view of the brake assembly of FIg. 1.

FIg. 3 is a cross-sectional view through the brake assembly taken along line 3–3 of FIG. 2.

Figure 4:
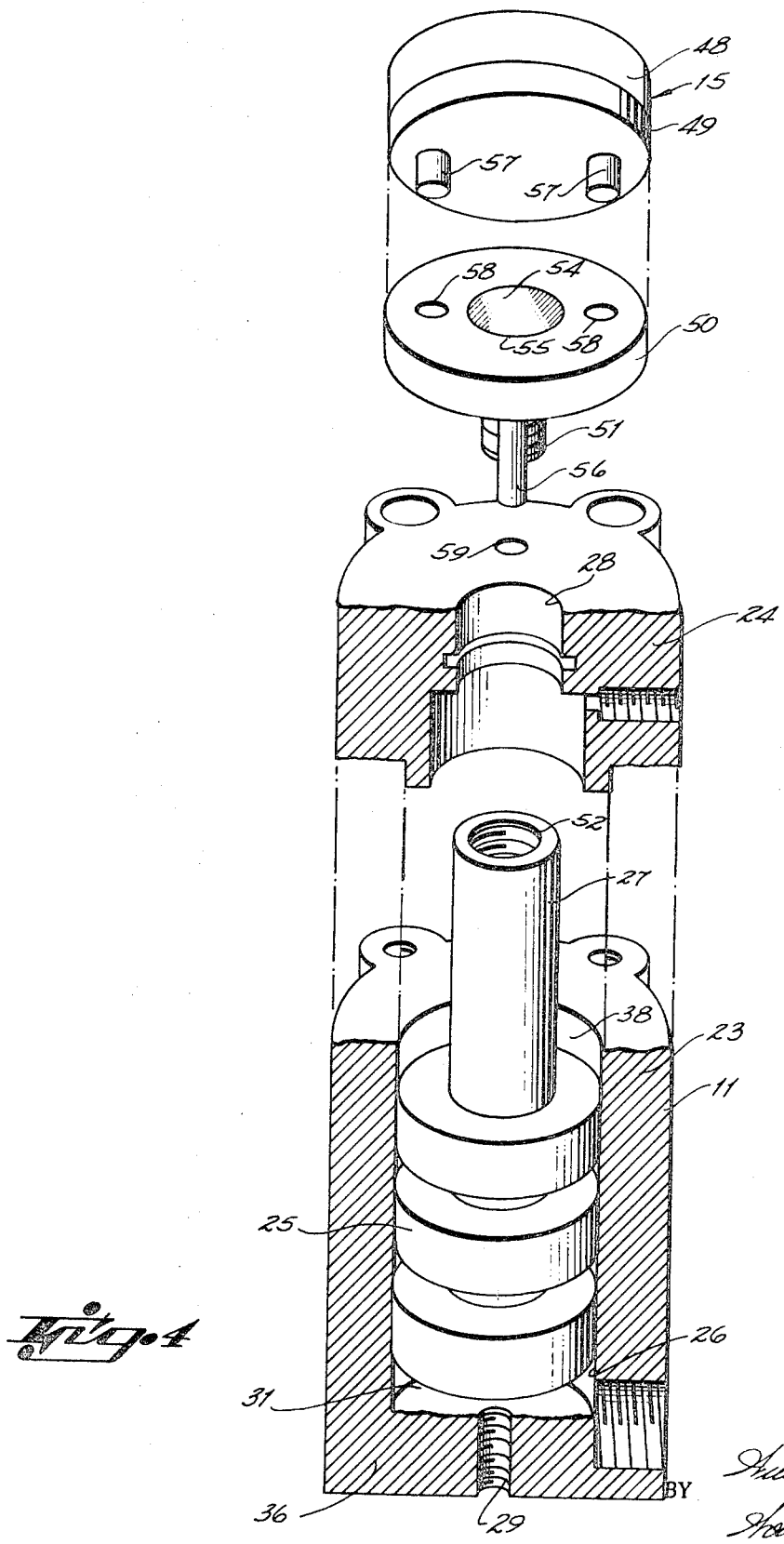
FIG. 4 is an exploded perspective view of the brakeshoe portion of the brake assembly.

Referring first to FIG. 1, it will be seen that one preferred embodiment of the disc brake assembly 5 comprises a brake disc 10, a pair of hydraulic brake cylinders or brake motors 11 and 12, a pneumatic booster cylinder or motor 13, and a pneumatic valve 14. The hydraulic motors 11 and 12 control movement of a pair of brakeshoes 15 and 16 into and out of engagement with opposite radial side surfaces of the disc 10. When engaged with the disc, the shoes 15 and 16 prevent or retard rotation of the disc. The disc in turn is keyed or otherwise fixedly connected to a shaft or other movable element of a machine such that stopping the disc 10 effects braking of the shaft or other element to which the disc is attached.

Hydraulic fluid under pressure is supplied to the hydraulic motors 11 and 12 from a hydraulic booster chamber 20 of the pneumatic booster cylinder or motor 13. Booster motor 13 is in turn controlled by the pneumatic valve 14. This valve 14 is a conventional four-way valve which alternately connects a source of air pressure 21 to either the pneumatic booster cylinder 13 or to the brake release side of the hydraulic cylinders 11 and 12. The valve is also operable to alternately connect to atmosphere the one of said booster cylinder or hydraulic brake cylinders 11 and 12 which is not connected to the source 21 of air pressure.

The two hydraulic brake motors 11 and 12 both comprise a brake cylinder block 23, an end cap 24, and a piston 25 movable within a cylindrical recess 26 of the cylinder block. A piston rod 27 formed integrally with the piston 25 extends through an aperture 28 in the end cap 24. On the pressure side of the piston 25, there is a fluid chamber 31 which has a threaded aperture 29 in its end wall 36. This aperture 29 accommodates a conventional fluid fitting 32 which is connected through a fluid conduit 33 to a T-fitting 34 threaded into a threaded aperture 35 in one end of the booster cylinder 13. This aperture 35 opens into the fluid pressure chamber 20 of the booster cylinder 13.

Both brake cylinder 23 also have threaded ports 37 extending through one sidewall and opening into the chamber 38 of the motors on the brake release side of the pistons 25. These ports 37 have fluid fittings mounted therein (not shown) which alternately connect the ports through pneumatic line 39 and valve 14 to either the source of air pressure 21 or to atmospheric pressure.

The cylinders 23 of the hydraulic brake motors 11 and 12 are both secured to the end face 41 of the booster cylinder 13 by T-shaped brackets 42, 43. These brackets are welded or formed integral with the housing 23 and have base flanges 44, 44 secured to the cylinder 13 by bolts 46.

The brakeshoe assemblies 15 and 16 each comprise an asbestos pad or friction element 48 bonded or otherwise permanently secured to a steel backing plate 49. The backing plate is in turn magnetically secured to a brake segment plate 50. This segment plate 50 has a threaded shaft 51 threaded into a threaded recess 52 in the inner end of the piston rod 27. A thin waferlike cylinder of permanent magnetic material 54 is bonded or otherwise fixedly secured within a recess 55 in the end face of the brake segment plate 50. The magnet 54 holds the backing plate 49 on the segment plate 50.

To prevent rotation and lateral shifting of the backing plate 49 relative to the brake segment plate 50, a pair of cylindrical lugs 57 or protrusions extend inwardly from the backing plate and are receivable within mating cylindrical recesses 58 in the segment plate 50. The pins 57 and apertures 58 thus hold this brake plate 50 against lateral movement while the magnet holds the plate against inadvertent axial movement. Similarly, guide rods 56 extend axially from the outside face of the segment plate 50 and are receivable within mating recesses 59 of the end cap 24 to prevent rotation of the segment plate 50 relative to the brake cylinder and cap.

With this construction, the brake pad 48 and backing plate 49 form a throwaway brake segment which is easily replaced after the brake pad 48 has worn out. The magnet enables the throwaway segment to be lifted off the segment plate without disassembling the brake or any portion of it. Specifically, removal of the throwaway segment simply involves overcoming the magnetic holding power of the magnet 54 so as to separate the backing plate 49 from the segment plate 50. Sufficient clearance is provided between the brake disc and the ends of the pads 48 to enable the pins 57 to be disengaged from the apertures 58 and moved laterally to disconnect the pads from the supporting segment plates 50.

The pneumatic booster cylinder motor 13 comprises a large housing or cylinder 60 and an end cap 61. The housing and cap define a central cylindrical cavity 62 within which a large diameter piston 63 is slidable. At its inner end, the cylindrical cavity 62 terminates in a small diameter coaxial recess 65 which defines the fluid chamber 20. A small diameter piston rod 67 extends into the recess 65 from the piston 63. This piston rod 67 acts as a piston and a pressure multiplier when air under pressure is supplied to the chamber 68 via air line 83 on the pressure side of the piston 63. When this occurs, air is vented to atmosphere on the low-pressure side of the piston 63 through an exhaust port 70. The piston 63 then moves inwardly and causes fluid entrapped in the chamber 20 to move through the conduits 33 into the end chamber 31 of the hydraulic brake motors 11 and 12. The pistons 25 of these motors 11, 12 then move inwardly so as to clamp the disc 10 between the brakeshoes on the ends of the piston rods 27. The pressure in the chamber 20 and the motor chamber 31 then increases in proportion to the difference in cross section area between the pistons 63 and 67. In one preferred embodiment, it has been found that approximately 100 pounds of air pressure applied to the piston 63 results in a hydraulic pressure in chamber 20 of approximately 2,000 pounds.

Preferably, O-rings 71, 72 surround the pneumatic booster motor piston 63 and prevent the blowby of air pressure from the high-pressure side of the piston to the low-pressure side. Similarly, two other O-rings 73, 74 surround the piston rod 67 and separate the hydraulic chamber 20 from the pneumatic chamber 75. While some leakage of hydraulic fluid does occur past the O-rings, it is minimal in amount and does not impair the operation of the brake. In fact, it is helpful for lubrication purposes. What small amount of fluid is lost may be replaced by connecting a small reservoir (not shown) to one of the bleeder ports (not shown) on the motors.

To prevent leakage of fluid past the pistons 25 of the hydraulic brake motors, three O-rings 78 preferably surround each of the pistons. Similarly, a small O-ring 79 surrounds each of the piston rods 27.

In operation, air under shop pressure which is usually in the order of 100 pounds of pressure is supplied through the valve 14 to either port 80 or port 81 of the valve 14. Port 80 is connected by a line 83 to the pressure side of chamber 68 of the pneumatic piston 63 while the port 81 is connected by a line 39 to the brake release side of the hydraulic motors 11 and 12. Assuming that the brake is to be applied so as to stop rotation of the disc 10, the spool of the valve 14 is positioned by an electromagnet or by any type of control mechanism so that the source of air pressure 21 is connected to the port 80 and thus to the pressure side of the piston 63. The piston 63 is then caused to move inwardly so as to increase the hydraulic pressure in the chamber 20, thereby effecting inward movement of the pistons 25 and the attached brake shoes.

When the port 80 of the valve 14 is connected to the source of pressure 81, the other outlet port 81 is connected through the spool to exhaust which is open to atmospheric pressure. Consequently, the air pressure in line 39 does not buck inward movement of the pistons 25 and brakeshoes 15 and 16.

When the brakes are to be released, the spool of the valve is actuated so as to connect the source of air pressure 21 to the port 81 while simultaneously connecting the port 80 to atmosphere. This results in the pressure side of the piston 63 being connected to atmosphere and the brake release side of the pistons 25 being connected to the air pressure line. Thus, shop pressure is connected to the brake release side of the pistons 25 so that the pistons are moved outwardly to disengage the brakeshoe pads from the disc.

The primary advantage of this brake assembly is that it eliminates the necessity for a conventional hydraulic pump to generate hydraulic pressures for actuating the hydraulic brake cylinders. Consequently, a complete brake package may be added to a machine without the necessity for providing a fluid pump to supply power for the brake cylinders. This brake also has the advantage of minimizing maintenance because of its simplicity and the fact that its hydraulic equipment is completely enclosed; i.e., no open tanks of oil, etc., to collect dust and debris. It also has no springs subject to wear and fatigue.

While I have described only a single preferred embodiment of my invention, those persons skilled in the arts to which this invention pertains will readily appreciate changes and modifications which may be made without departing from the spirit of my invention. Therefore, I do not intend to be limited except by the scope of the appended claims.

Having described my invention I claim:

1. A brake assembly for stopping rotation of a rotary disc, said assembly comprising a pair of opposed braking elements adapted to be moved into engagement with opposite radial side surfaces of the disc, a pair of expansible hydraulic motors operatively connected to said braking elements, said motors being operable to control movement of said elements into and out of engagement with said discs, each of said motors comprising a cylinder and a piston movable within said cylinder, a housing, means for mounting said expansible hydraulic motor cylinder directly upon said housing such that said housing and hydraulic motors comprise a unitary assembly, a pneumatic booster motor located within said housing and comprising a cylinder and a piston movable within said cylinder, a fluid chamber located within said housing at one end of said pneumatic motor cylinder, a piston rod secured to said pneumatic motor piston and movable within said fluid chamber, fluid conduits interconnecting said fluid chamber and one end of each of said hydraulic motor cylinders, said chamber and said conduits being filled with hydraulic fluid such that movement of said pneumatic motor piston upon admission of air pressure to one end of said pneumatic motor cylinder effects extension of said pneumatic motor piston rod into said chamber and causes said hydraulic motor pistons to be extended so as to move said braking elements into engagement with said disc, and a pneumatic valve operable to alternately connect a source of air pressure to either said one end of said pneumatic motor cylinder or the ends opposite from said one end of each of said hydraulic motor cylinders, the connection being such that when air pressure is supplied to said one end of said pneumatic motor cylinder said braking elements are moved into engagement with said braking disc and when the ends opposite from said one ends of said hydraulic motors are connected to said source of air pressure said braking elements are moved away from and out of engagement with said brake disc.

2. The brake assembly of claim 1 wherein said valve is operable to connect the one of said one end of said pneumatic motor and said opposite ends of said hydraulic motors to atmospheric pressure when the other is connected to said source of air pressure.

3. The brake assembly of claim 2, wherein each of said braking elements is magnetically secured to a movable element of one of said pair of hydraulic motors.